Figure 4:
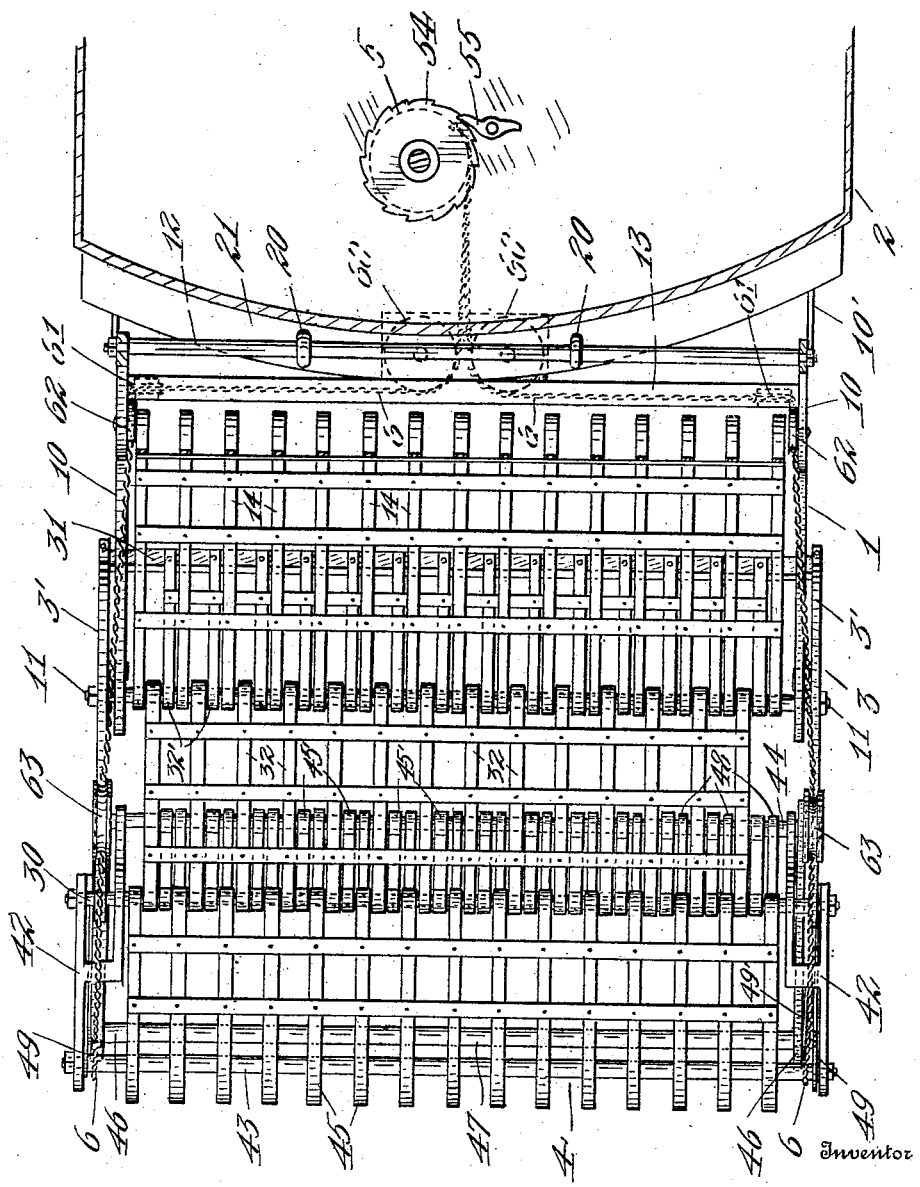

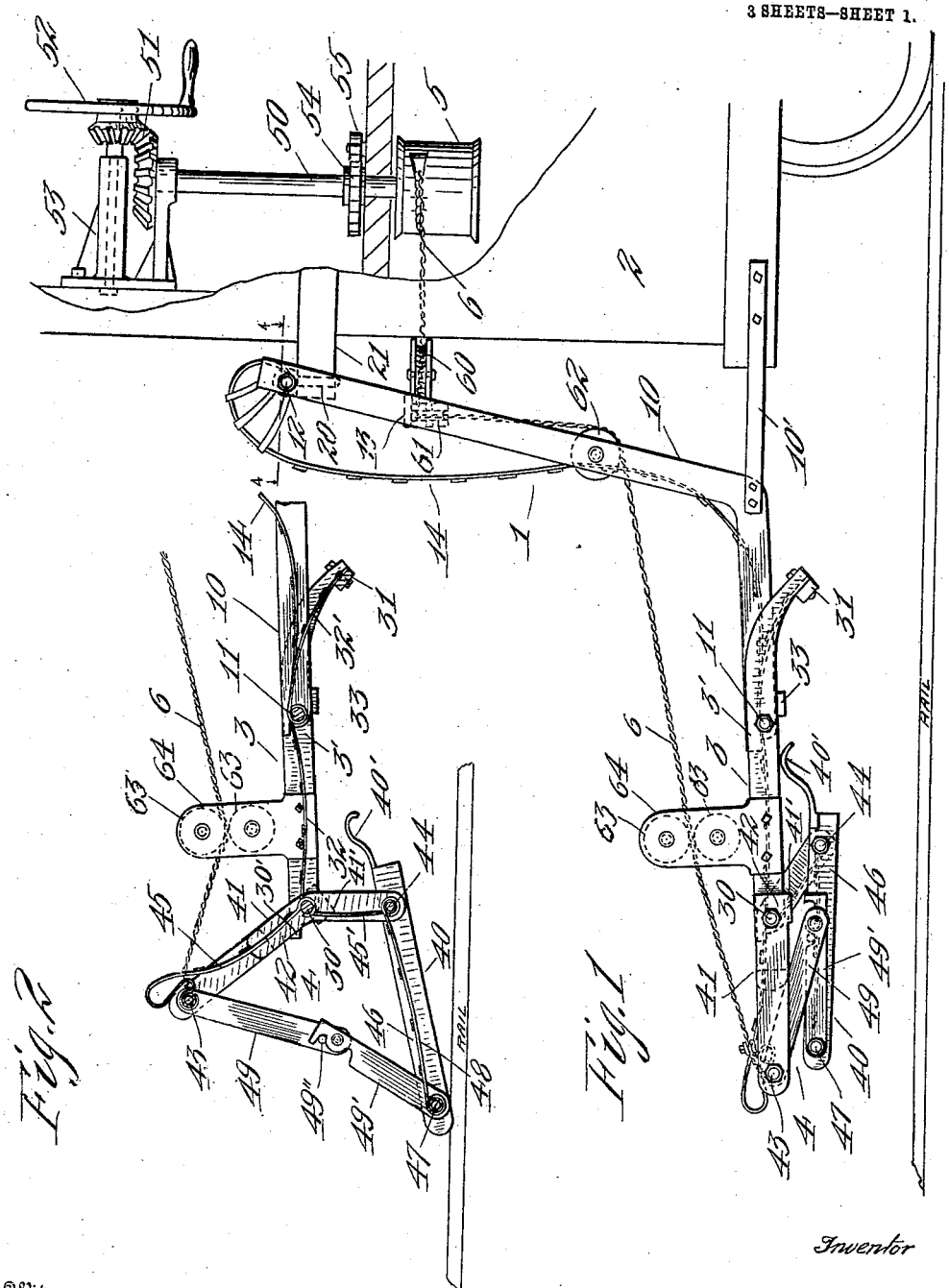

S. J. OSTROWSKI.
CAR FENDER.
APPLICATION FILED AUG. 11, 1908.
915,373.
Patented Mar. 16, 1909.
3 SHEETS—SHEET 2.
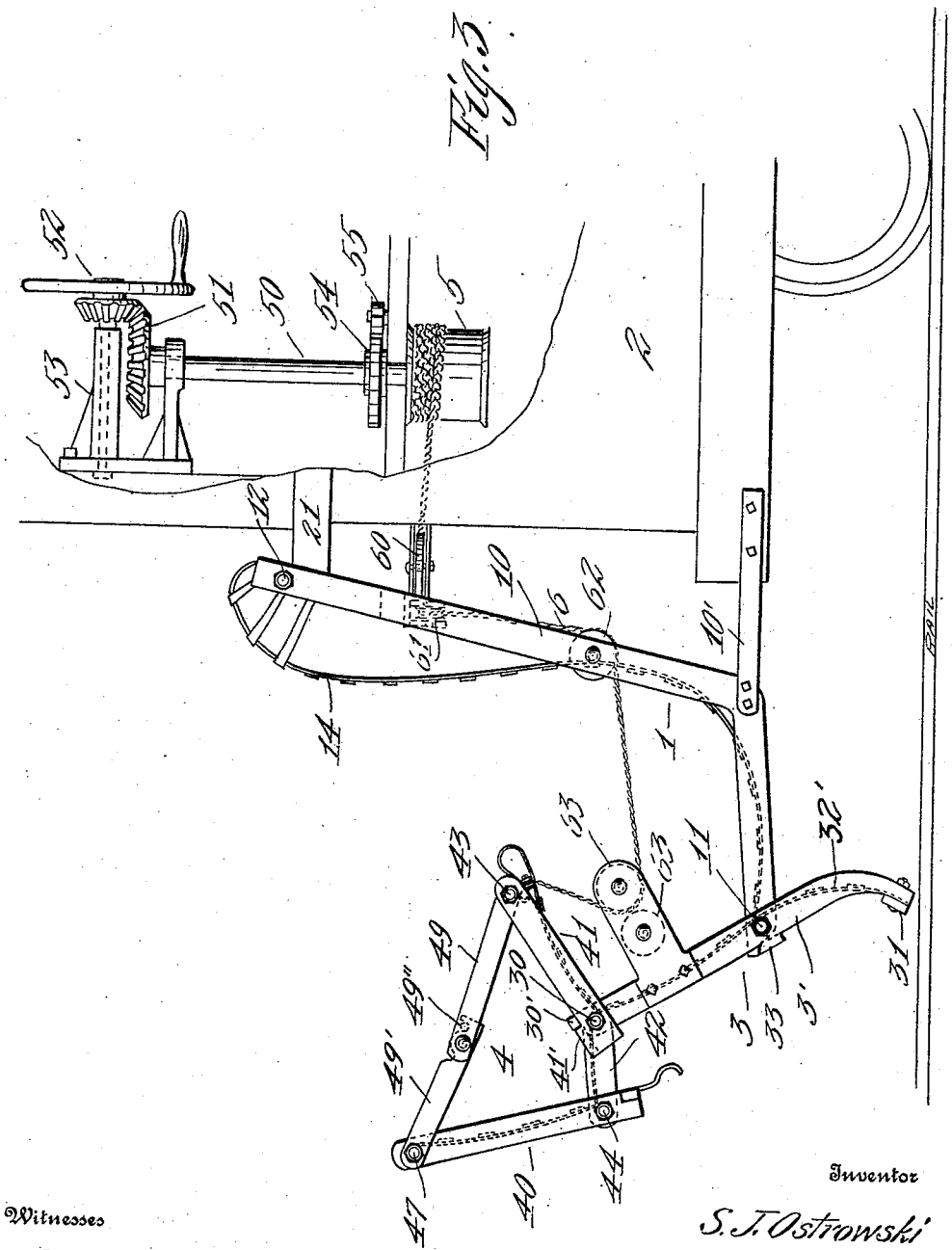
Witnesses
E. W. Cresseman.
Arlita Adams.
Inventor
S. J. Ostrowski
By Adams & Brooks
Attorneys

S. J. OSTROWSKI.
CAR FENDER.
APPLICATION FILED AUG. 11, 1908.

915,373.

Patented Mar. 16, 1909.
3 SHEETS—SHEET 3.

Witnesses
E. W. Creseman
Arlita Adams

Inventor
S. J. Ostrowski
By Adams & Brooks
Attorneys

UNITED STATES PATENT OFFICE.

STANLEY J. OSTROWSKI, OF SEATTLE, WASHINGTON.

CAR-FENDER.

No. 915,373.  Specification of Letters Patent.  Patented March 16, 1909.

Application filed August 11, 1908. Serial No. 448,029.

*To all whom it may concern:*

Be it known that I, STANLEY J. OSTROWSKI, a citizen of the United States of America, and a resident of the city of Seattle, in the county of King and State of Washington, have invented certain new and useful Improvements in Car-Fenders, of which the following is a specification.

The pimary object of the invention is the provision of an improved fender comprising articulated sections arranged for relative adjustment to present the fender in various desirable forms whereby a greater degree of safety against the loss of life or limb is insured.

Further objects and advantages will be set forth in the following description and those features on which I desire protection defined in the appended claims.

In the accompanying drawings I have disclosed my invention in such form as now preferred by me.

With reference to the drawing wherein like reference numerals indicate corresponding parts throughout: Figure 1 is a view in side elevation illustrating a fender embodying my invention in one form of adjustment and connected with the forward portion of a car, the latter being shown in broken section. Fig. 2 is a fragmentary view in longitudinal section illustrating the fender in another form of adjustment. Fig. 3 is a similar view to Fig. 1 showing the fender in still another form of adjustment, and Fig. 4 is a plan view in partial section taken on line 4—4 of Fig. 1.

With reference to the drawings, numeral 1 designates a fender section which I will term a main section, the same, as shown, comprising substantially L-shaped side members 10, cross members 11, 12 and 13 secured to said side members and a suitable facing including reversely curved strips 14 of resilient metal secured at their ends to the members 11 and 12. This main section of the fender may be secured in position on the car as 2, in any suitable manner; I have, however, shown the cross member 12 engaging eye-bolts 20 secured to a projecting ledge 21 of the car and the side members 10 provided with rearwardly projecting base extensions 10' secured to the car frame.

At the forward end of section 1 is a guard section 3 comprising rock arms, as 3' pivotally engaged intermediate their ends with member 11, cross members 30 and 31 secured to said arms, and a facing including strips 32 and 32' secured to members 30 and 31 respectively and having their inner end portion bent about member 11 to turn thereon.

Carried by the rock arms 3' is a folding cradle 4 including fender sections 40 and 41, the latter comprising angular side pieces 42 swingingly engaged intermediate their ends with member 30 of the guard frame, cross members 43 and 44 secured to said side pieces and a facing including strips 45 and 45' secured to members 43 and 44 respectively and having their inner end portions bent about member 30 to turn thereon. Frame section 40 consists of side pieces 46 pivotally engaged at their rear ends with member 44 of section 41, a cross member 47 secured to the forward ends of said side pieces and a facing including strips 48 secured at one end to member 47 and bent about member 44 to turn thereon. The sections 40 and 41 are connected at the forward ends by flexible ties consisting of pivotally connected links 49 and 49' swingingly engaged with the cross members 43 and 47 respectively. Each link 49 carries a suitable stop as 49'' adjacent its point of connection with the companion link 49' which is adapted to engage in suitable notches provided in the latter to insure the relative positions of the sections 40 and 41 when the cradle is folded or open as indicated in Figs. 1 and 2 respectively.

In the normal position of the parts, as shown in Fig. 1, the fender sections 3 and 41 occupy substantially horizontal positions wherein they are maintained from downward swing by lugs 33 provided on the rock arms 3' and engaging the side members 10 and lugs 41' provided on the side pieces 42 and engaging said arms. In this position of the parts, section 40 lies beneath section 41 substantially horizontal and is prevented from swinging downwardly by rearwardly projecting stops 40' secured to the side pieces 46 and engaging adjacent rock arms 30.

While other provision may be made for effecting adjustment of the fender sections I have shown for this purpose a take up mechanism including a drum 5 secured to a shaft 50 rotatably mounted on car 2 and connected by means of gears 51 with a hand wheel 52 mounted on a bracket 53 fastened to said car. Secured to drum 5 and to member 43 of section 40 are cables 6 which engage each its respective guide sheaves as 60, 61 and 62 mounted on the frame of the fender section 1, and pass between respective bearing wheels 63 mounted on standards 64 secured to the rock arms 3'.

Secured to the shaft 50 is a ratchet wheel 54 adapted for engagement with a relatively fixed pawl 55 to secure the shaft from rotation when desired to secure the movable fender sections in various positions of adjustment as will be understood from the following. In the normal position of the parts as shown in Fig. 1, the fender will act in a satisfactory manner to receive and carry a person falling from an erect position. A great many accidents, however, occur by reason of a person stumbling in attempting to cross the track in front of an approaching car in which event the motorman or attendant operates wheel 52 to wind up cable 6 and thereby open cradle 4 to the position shown in Fig. 2 wherein the forward edge of section 40 lies adjacent the rails of the track to scoop up the person. After the person is received in cradle 4 it may be swung upwardly on pivot 30 by further operation of drum 5 until lugs 41' engage the forward end portions 30' of arms 3' thereby adjusting the cradle to a position wherein the person will be prevented from rolling therefrom. If the car is under considerable headway at this time and a second person in danger thereof, further operation of drum 5 may be effected as before to swing guard section 3 into an angular position relatively to the adjacent portion of section 1, as indicated in Fig. 3, to engage the person in advance of the car.

From the foregoing it will be understood that one person may be caught on the fender with its part in normal position, a second caught up in the cradle and a third engaged by the guard section.

Having thus described my invention what I claim as new, and desire to secure by Letters Patent of the United States of America, is:

1. A car fender comprising a main frame, rock arms mounted thereon, a supplemental section normally lying below said main section and swingingly connected with said rock arms, and means for swinging said supplemental section forwardly of said main section.

2. A car fender comprising a main frame, a cradle supported on said frame at the forward end thereof, comprising fender sections connected for movement toward and from one another and means for swinging said cradle bodily to a point above said main frame.

3. A car fender comprising a main frame, a cradle supported below said main frame for movement to a point above the same, a guard connected for movement to an operative position beneath said main frame by and during upward movement of said cradle, and means for swinging said cradle bodily to a point above said main frame.

4. A car fender comprising a main section, a supplemental section normally lying substantially horizontal below the main section and means connecting said sections for supporting the supplemental section for adjustment forwardly into a downwardly inclined position.

5. A car fender comprising a main section, rock arms mounted thereon, a supplemental section swingingly connected with said rock arms and normally lying beneath the same, and means to effect forward swing of said supplemental section and swing the same upwardly.

6. A car fender comprising a main section, a cradle forwardly thereof comprising pivotally connected fender sections, swingingly connected with said main section and normally lying in closed relation, means to limit relative movement of said cradle sections, and means to swing said cradle.

7. A car fender comprising a main section, a guard section normally lying substantially horizontal, and pivotally connected with said main section for adjustment across the forward edge thereof, a cradle comprising pivotally connected fender sections normally lying substantially horizontal, one of said last sections being pivotally supported on said guard section, means to limit relative movement of the cradle sections, means to swing the cradle, and means to engage the cradle with said guard section to adjust the latter.

8. A car fender comprising a main section, a guard section normally lying substantially horizontal and pivotally connected with said first section for angular adjustment, a cradle comprising pivotally connected fender sections normally lying one above the other, the upper one of said last sections being pivotally supported on said guard section, means to swing said upper cradle section, means to limit relative movement of said cradle section, and means to engage the cradle with said guard section to adjust the latter and elevate the cradle.

Signed at Seattle, Washington, this 3rd day of August, 1908.

STANLEY J. OSTROWSKI.

Witnesses:
JOHN W. FILKINS.
SARAH B. FOLEY.